(No Model.)
J. A. LOUGH.
BELT GEARING.
No. 410,367. Patented Sept. 3, 1889.
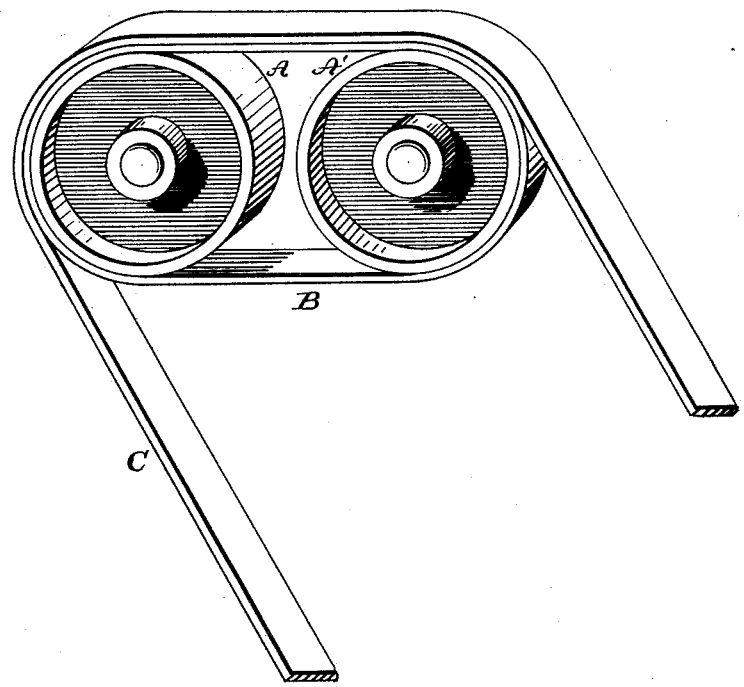
WITNESSES:
INVENTOR:
J. A. Lough
BY Munn & Co.
ATTORNEYS.

United States Patent Office.

JOHN ALEXANDER LOUGH, OF CHETOPA, KANSAS.

BELT-GEARING.

SPECIFICATION forming part of Letters Patent No. 410,367, dated September 3, 1889.

Application filed July 31, 1888. Serial No. 281,545. (No model.)

*To all whom it may concern:*

Be it known that I, JOHN ALEXANDER LOUGH, of Chetopa, in the county of Labette and State of Kansas, have invented a new and useful Improvement in Belt-Gearing, of which the following is a specification, reference being had to the annexed drawing, which is a perspective view.

My invention relates more particularly to driving four-roller mills; but I do not confine my improvement to this use.

In four-roller mills the pulleys by which the rollers are driven are very near together, and when they are driven by a single belt the usual method of securing sufficient friction to drive them is to employ a tightener pressing on the belt between the two driving-pulleys, the tightener being on the taut side of the belt, thereby increasing the pressure of the roller-shafts upon their journals and increasing the amount of power required to drive the mills.

My invention consists in the construction and arrangement of parts, as will be hereinafter fully described and claimed.

The pulleys A A' are arranged upon the roller-shafts, which are parallel with each other, and a belt B partly surrounds the peripheries of the said pulleys. The main driving-belt C passes around the pulleys and over the belt B, imparting its power to the belt B, which transmits it to the pulleys A A'. It will be noticed that the belt C, if in contact with the pulleys, will only engage a small portion of their surface, while the belt B engages half of the periphery of each pulley. By means of my improvement, therefore, the power of the belt C is transmitted to the pulleys A A' through the friction of the belt B upon half the periphery of each pulley.

In addition to relieving the shafts of the rollers from undue pressure, I secure the further advantage of avoiding the running off of the main belt C.

Having thus described my invention, I claim as new and desire to secure by Letters Patent—

The combination, with two adjacent pulleys and the belt B, passed around said pulleys, of the main driving-belt C, passing over the belt B and in contact with it at the points where it passes around both pulleys, substantially as set forth.

JOHN ALEXANDER LOUGH.

Witnesses:
 R. B. WHITE,
 EDGAR D. BATES.